United States Patent
Longman et al.

(10) Patent No.: US 10,914,819 B2
(45) Date of Patent: Feb. 9, 2021

(54) MITIGATING VIBRATION IN A RADAR SYSTEM ON A MOVING PLATFORM

(71) Applicant: GM Global Technology Operations LLC, Detroit, MI (US)

(72) Inventors: Oren Longman, Tel Aviv (IL); Shachar Shayovitz, Ness Ziona (IL); Shahar Villeval, Tel Aviv (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 384 days.

(21) Appl. No.: 16/052,922

(22) Filed: Aug. 2, 2018

(65) Prior Publication Data

US 2020/0041610 A1 Feb. 6, 2020

(51) Int. Cl.
| | |
|---|---|
| *G01S 7/40* | (2006.01) |
| *G01S 13/86* | (2006.01) |
| *G01S 7/35* | (2006.01) |
| *G01S 13/931* | (2020.01) |
| *G01S 13/89* | (2006.01) |
| *G01S 7/02* | (2006.01) |

(52) U.S. Cl.
CPC ............... *G01S 7/40* (2013.01); *G01S 7/352* (2013.01); *G01S 13/86* (2013.01); *G01S 13/89* (2013.01); *G01S 13/931* (2013.01); *G01S 7/023* (2013.01); *G01S 2007/356* (2013.01)

(58) Field of Classification Search
CPC ........ G01S 7/40; G01S 7/4004; G01S 7/4008; G01S 7/4021; G01S 7/4026; G01S 7/352; G01S 13/86; G01S 13/89; G01S 7/023; G01S 2007/356; G01S 13/931
See application file for complete search history.

(56) References Cited

U.S. PATENT DOCUMENTS

| | | | | |
|---|---|---|---|---|
| 3,911,731 A * | 10/1975 | Walker | ................... | G01M 1/02 |
| | | | | 73/660 |
| 5,760,731 A * | 6/1998 | Holmes | ................... | G01S 13/56 |
| | | | | 342/118 |
| 6,121,917 A * | 9/2000 | Yamada | ................ | G01S 13/345 |
| | | | | 342/104 |
| 8,746,035 B2 * | 6/2014 | Peczalski | ............... | G01H 3/005 |
| | | | | 73/1.82 |
| 8,957,807 B2 * | 2/2015 | Mills | ................... | G01S 7/4026 |
| | | | | 342/165 |
| 9,927,514 B2 * | 3/2018 | Giunta | .................... | G01S 13/58 |

(Continued)

*Primary Examiner* — Peter M Bythrow
(74) *Attorney, Agent, or Firm* — Cantor Colburn LLP

(57) ABSTRACT

A method of mitigating vibration in a radar system on a moving platform includes obtaining received signals resulting from reflections of transmitted signals by one or more objects in a field of view of the radar system. The received signals are a three-dimensional data cube. The method also includes processing the received signals to obtain a first three-dimensional map and second three-dimensional map, estimating the vibration based on performing a first detection using the second three-dimensional map, and cancelling the vibration from the first three-dimensional map to obtain a corrected first three-dimensional map. A corrected second three-dimensional map is obtained by further processing the corrected first three-dimensional map; and a second detection is performed using the corrected second three-dimensional map.

20 Claims, 4 Drawing Sheets

(56) References Cited

U.S. PATENT DOCUMENTS

| | | | |
|---|---|---|---|
| 2007/0194982 A1* | 8/2007 | Stove | G01S 7/4017 342/174 |
| 2009/0046000 A1* | 2/2009 | Matsuoka | G01S 13/426 342/147 |
| 2011/0288796 A1* | 11/2011 | Peczalski | G01H 9/00 702/56 |
| 2012/0127016 A1* | 5/2012 | Watanabe | G01S 7/412 342/70 |
| 2013/0016003 A1* | 1/2013 | Stirling-Gallacher | G01S 13/89 342/174 |
| 2014/0260523 A1* | 9/2014 | Peczalski | G01H 3/005 73/1.82 |
| 2015/0309160 A1* | 10/2015 | Giunta | G01H 9/00 342/118 |
| 2016/0054438 A1* | 2/2016 | Patole | G01S 13/343 342/127 |
| 2016/0124076 A1* | 5/2016 | Nakatani | G01S 13/931 342/174 |
| 2016/0299216 A1* | 10/2016 | Matsumoto | G01S 13/867 |
| 2017/0219691 A1* | 8/2017 | Farmer | G01S 13/38 |
| 2019/0195728 A1* | 6/2019 | Santra | G01M 5/0091 |
| 2019/0212429 A1* | 7/2019 | Yamanouchi | A61B 5/1113 |

* cited by examiner

MITIGATING VIBRATION IN A RADAR SYSTEM ON A MOVING PLATFORM

The subject disclosure relates to mitigating vibration in a radar system on a moving platform.

Vehicles (e.g., automobiles, trucks, construction equipment, farm equipment, automated manufacturing equipment) are an example of moving platforms that increasingly uses sensors to detect objects in their vicinity. The detection may be used to augment or automate vehicle operation. Exemplary sensors include cameras, light detection and ranging (lidar) systems, radio detection and ranging (radar) systems. The radar may output a frequency modulated continuous wave (FMCW) signal and, more particularly, a linear frequency modulated continuous wave (LFMCW) signal, referred to as a chirp. A shift in the frequencies of received reflections from the transmitted frequencies results from relative movement of the reflecting target and is referred to as the Doppler shift. Traditionally, information from the FMCW radar system is considered by using a range-Doppler map. In a range-Doppler map, range is along one axis, and Doppler is along a perpendicular axis. When the radar system is located in a moving platform, such as a vehicle, vibration can cause displacement of the antennas of the radar system and negatively affect operation. For example, signal-to-noise ratio (SNR) may decrease and false detections may increase due to the vibration. Accordingly, it is desirable to provide mitigation of vibration in a radar system on a moving platform.

SUMMARY

In one exemplary embodiment, a method of mitigating vibration in a radar system on a moving platform includes obtaining received signals resulting from reflections of transmitted signals by one or more objects in a field of view of the radar system. The received signals are a three-dimensional data cube. The method also includes processing the received signals to obtain a first three-dimensional map and a second three-dimensional map, estimating the vibration based on performing a first detection using the second three-dimensional map, and cancelling the vibration from the first three-dimensional map to obtain a corrected first three-dimensional map. A corrected second three-dimensional map is obtained by further processing the corrected first three-dimensional map, and a second detection is performed using the corrected second three-dimensional map.

In addition to one or more of the features described herein, the radar system includes multiple transmit channels and receive channels, the transmitted signals are linear frequency modulated continuous wave signals referred to as chirps, and the obtaining the received signals includes obtaining the three-dimensional data cube with a time dimension, a chirp dimension, and a channel dimension.

In addition to one or more of the features described herein, the processing the received signals includes performing a fast Fourier transform (FFT) and performing beamforming and obtaining the first three-dimensional map with a range dimension, the chirp dimension, and a beam dimension.

In addition to one or more of the features described herein, the processing the received signals also includes performing a second FFT on the first three-dimensional map and obtaining the second three-dimensional map with the range dimension, a Doppler dimension, and the beam dimension.

In addition to one or more of the features described herein, the estimating the vibration includes estimating amplitude and frequency of vibration.

In addition to one or more of the features described herein, the obtaining the corrected second three-dimensional map from the corrected first three-dimensional map includes performing an FFT on the corrected first three-dimensional map.

In addition to one or more of the features described herein, the moving platform is a vehicle, and the performing the second detection provides information used to augment or automate operation of the vehicle.

In another exemplary embodiment, a radar system subject to vibration on a moving platform includes at least one receive antenna to obtain received signals resulting from reflections of transmitted signals by one or more objects in a field of view of the radar system. The received signals are a three-dimensional data cube. The radar system also includes a processor to process the received signals to obtain a first three-dimensional map and a second three-dimensional map, to estimate the vibration based on a first detection using the second three-dimensional map, to cancel the vibration from the first three-dimensional map to obtain a corrected first three-dimensional map, to obtain a corrected second three-dimensional map by further processing the corrected first three-dimensional map, and to perform a second detection using the corrected second three-dimensional map.

In addition to one or more of the features described herein, the radar system includes a plurality of transmit channels and a plurality of receive channels, the transmitted signals are linear frequency modulated continuous wave signals referred to as chirps, and the three-dimensional data cube has a time dimension, a chirp dimension, and a channel dimension.

In addition to one or more of the features described herein, the processor performs a fast Fourier transform (FFT) and beamforming to obtain the first three-dimensional map with a range dimension, the chirp dimension, and a beam dimension.

In addition to one or more of the features described herein, the processor also performs a second FFT on the first three-dimensional map to obtain the second three-dimensional map with the range dimension, a Doppler dimension, and the beam dimension.

In addition to one or more of the features described herein, the processor estimating the vibration includes estimating amplitude and frequency of vibration.

In addition to one or more of the features described herein, the processor obtains the corrected second three-dimensional map from the corrected first three-dimensional map by performing an FFT on the corrected first three-dimensional map.

In addition to one or more of the features described herein, the moving platform is a vehicle.

In addition to one or more of the features described herein, the processor obtains information used to augment or automate operation of the vehicle based on performing the second detection.

In yet another exemplary embodiment, a vehicle includes a radar system subject to vibration. The radar system includes at least one receive antenna to obtain received signals resulting from reflections of transmitted signals by one or more objects in a field of view of the radar system. The received signals are a three-dimensional data cube. The radar system also includes a processor to process the received signals to obtain a first three-dimensional map and a second three-dimensional map, to estimate the vibration based on a first detection using the second three-dimensional map, to cancel the vibration from the first three-dimensional map to obtain a corrected first three-dimensional map, to obtain a corrected second three-dimensional map by further processing the corrected first three-dimensional map, and to perform a second detection using the corrected second three-dimensional map. The vehicle also includes a vehicle controller to obtain information from the second detection and augment or automate operation of the vehicle based on the information.

In addition to one or more of the features described herein, the radar system includes a plurality of transmit channels and a plurality of receive channels, the transmitted signals are linear frequency modulated continuous wave signals referred to as chirps, and the three-dimensional data cube has a time dimension, a chirp dimension, and a channel dimension.

In addition to one or more of the features described herein, the processor performs a fast Fourier transform (FFT) and beamforming to obtain the first three-dimensional map with a range dimension, the chirp dimension, and a beam dimension.

In addition to one or more of the features described herein, the processor also performs a second FFT on the first three-dimensional map to obtain the second three-dimensional map with the range dimension, a Doppler dimension, and the beam dimension.

In addition to one or more of the features described herein, the processor obtains the corrected second three-dimensional map from the corrected first three-dimensional map by performing an FFT on the corrected first three-dimensional map.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
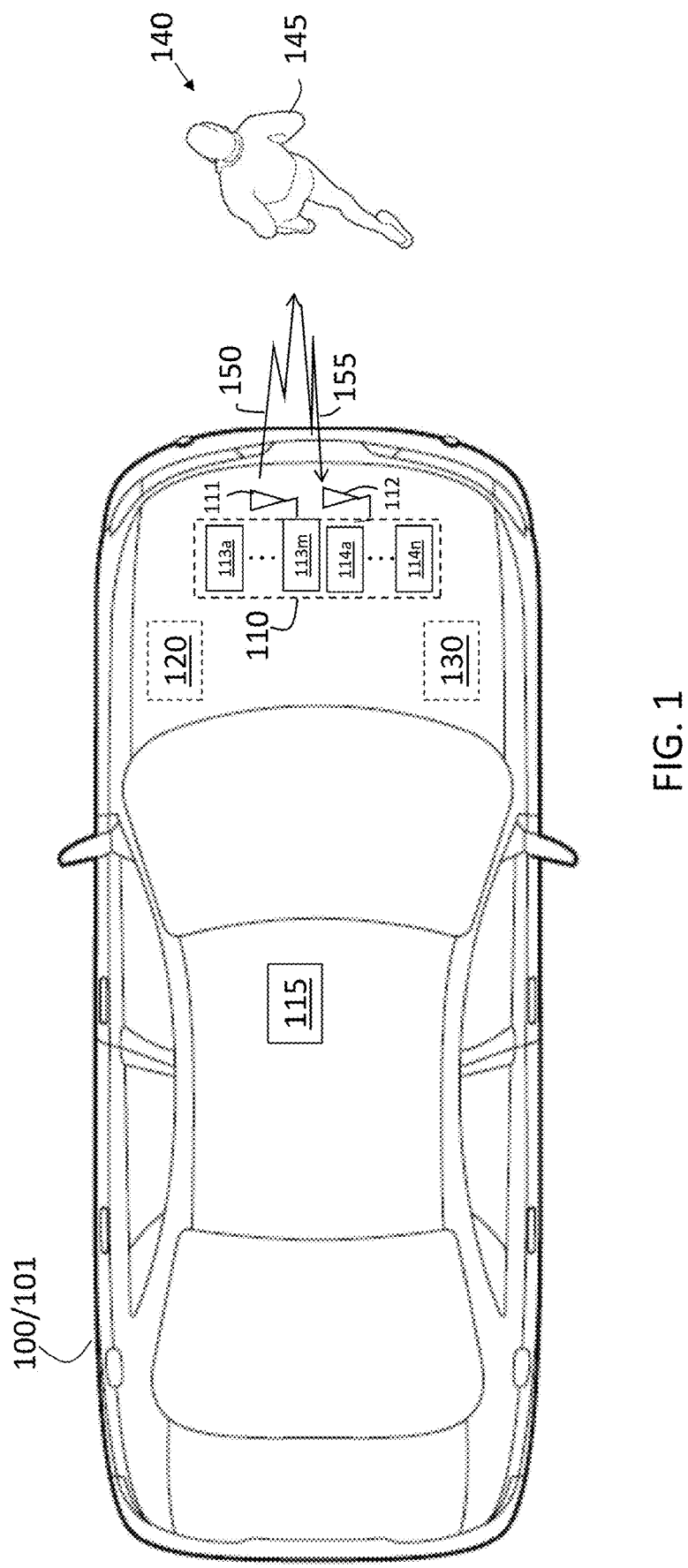
FIG. 1 is a block diagram of a scenario involving a radar system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, an FMCW radar transmits chirps and develops a range-Doppler map from the received reflections. The reflections may be regarded as a three-dimensional data cube with time, chirp, and channel as the three dimensions. The typical processing of received reflections includes performing an analog-to-digital conversion and a fast Fourier transform (FFT) with respect to range (referred to as a range FFT). The result of the range FFT is an indication of energy distribution across ranges detectable by the radar for each chirp that is transmitted, and there is a different range FFT associated with each receive channel and each transmit channel. Thus, the total number of range FFTs is a product of the number of transmitted chirps and the number of receive channels.

A Doppler FFT is then performed on the range FFT result. The Doppler FFT is also a known process in radar detection and is used to obtain a range-Doppler map per receive channel. For each receive channel and transmit channel pair, all the chirps are processed together for each range bin of the range-chip map (obtained with the range FFT). The result of the Doppler FFT, the range-Doppler map, indicates the relative velocity of each detected target along with its range. The number of Doppler FFTs is a product of the number of range bins and the number of receive channels.

Digital beamforming results in a range-Doppler (relative velocity) map per beam. Digital beamforming is also a known process and involves obtaining a vector of complex scalars from the vector of received signals and the matrix of actual received signals at each receive element for each angle of arrival of a target reflection. Digital beamforming provides an azimuth angle and elevation angle to each of the detected targets based on a thresholding of the complex scalars of the obtained vector. The outputs that are ultimately obtained from processing the received signals are range, Doppler, azimuth, elevation, and amplitude of each target.

As also noted, vibration of the platform (e.g., vehicle) on or in which the radar system is located can affect SNR and detection. As such, according to one or more embodiments, the previously discussed convention process flow is augmented and rearranged to mitigate vibration in a radar system on a moving platform. Specifically, digital beamforming is performed prior to a Doppler FFT and the result is used to cancel vibration that is estimated according to detection that is based on the Doppler FFT following the digital beamforming.

In accordance with an exemplary embodiment, FIG. 1 is a block diagram of a scenario involving a radar system 110. The vehicle 100 shown in FIG. 1 is an automobile 101. The radar system 110 may be a multi-input multi-output (MIMO) system with a number of transmit channels 113a through 113m (generally referred to as 113) and a number of receive channels 114a through 114n (generally referred to as 114). The transmit channels 113 are shown to share an exemplary transmit antenna 111 that transmits a transmit signal 150, and the receive channels 114 are shown to share an exemplary receive antenna 112 that receives a resulting reflection 155 in the exemplary radar system 110 of FIG. 2. In alternate or additional embodiments, the radar system 110 may include transceivers or additional transmit antennas 111 and receive antennas 112. There may be as many transmit antennas 111 as transmit channels 113 and as many receive antennas 112 as receive channels 114, for example. In addition, the exemplary radar system 110 is shown under the hood of the automobile 101. According to alternate or additional embodiments, one or more radar systems 110 may be located elsewhere in or on the vehicle 100. Another sensor 115 (e.g., camera, sonar, lidar system) is shown, as well. Information obtained by the radar system 110 and one or more other sensors 115 may be provided to a controller 120 (e.g., electronic control unit (ECU)) for image or data processing, target recognition, and subsequent vehicle control.

The controller 120 may use the information to control one or more vehicle systems 130. In an exemplary embodiment, the vehicle 100 may be an autonomous vehicle and the controller 120 may perform known vehicle operational control using information from the radar system 110 and other sources. In alternate embodiments, the controller 120 may augment vehicle operation using information from the radar system 110 and other sources as part of a known system (e.g., collision avoidance system, adaptive cruise control system, driver alert). The radar system 110 and one or more other sensors 115 may be used to detect objects 140, such as the pedestrian 145 shown in FIG. 1. The controller 120 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
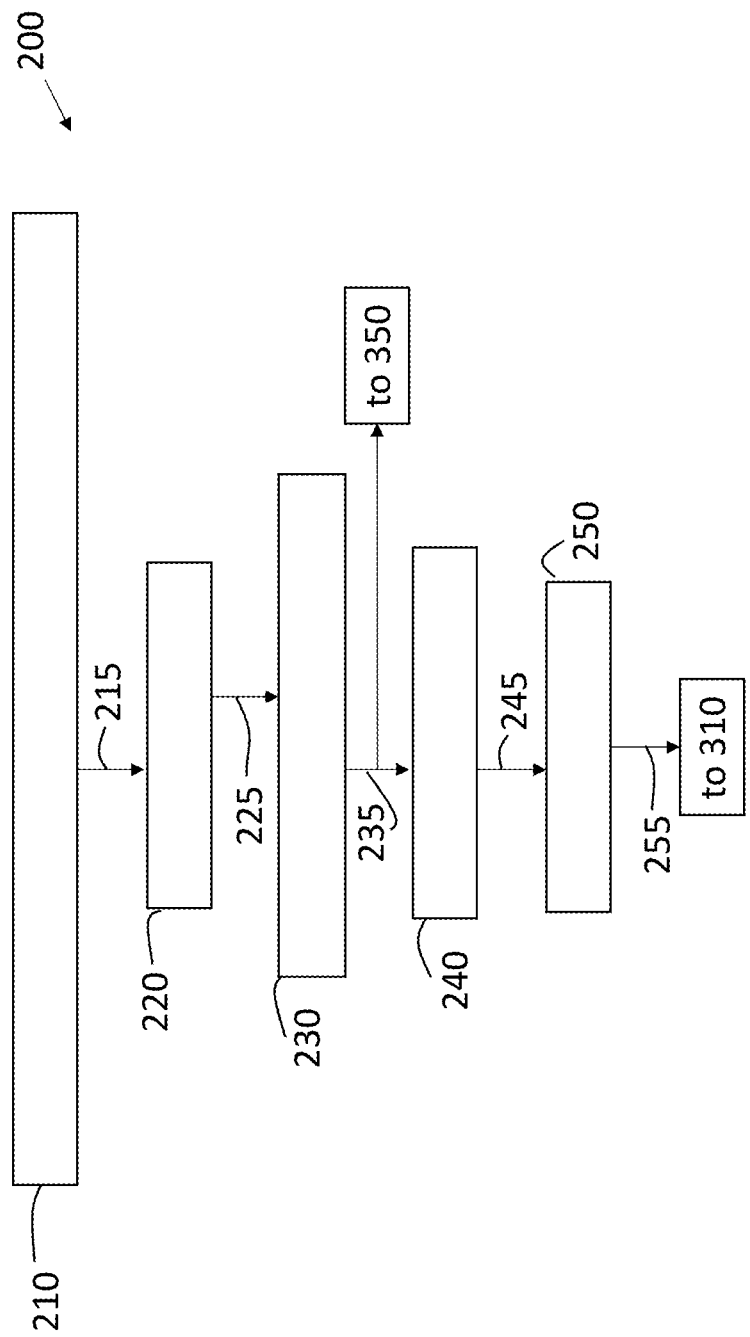
FIG. 2 is a process flow of aspects of a method of mitigating vibration in a radar system disposed on or in a vehicle according to one or more embodiments.

FIG. 2 is a process flow of aspects of a method 200 of mitigating vibration in a radar system 110 disposed on or in a vehicle 100 according to one or more embodiments. The processes shown in FIG. 2 generate the information needed to estimate and cancel vibration, as further discussed with reference to FIG. 3. At block 210, obtaining reflections 155 and performing analog-to-digital conversion refers to the controller 120 including an analog-to-digital converter (ADC) and providing digital samples 215 for further processing. As previously noted, the reflections 155 may be a three-dimensional cube with time, chirp, and channel as the three dimensions.

At block 220, performing a range FFT on the samples 215 essentially means converting the time dimension of the three-dimensional cube into range based on the known relationship between time-of-flight of the transmit signal 150 and reflection 155 and range. The range FFT at block 220 results in a range-chirp-channel map 225. Performing digital beamforming, at block 230, represents a departure from the conventional processing order, which typically includes Doppler FFT prior to beamforming. The beamforming, at block 230, essentially means converting the channel dimension of the three-dimensional cube into beams that define an azimuth and elevation. The beamforming at block 230 results in a range-chirp-beam map 235.

As FIG. 2 indicates, the range-chirp-beam map 235 is provided to block 350 (FIG. 3) in addition to being used to perform Doppler FFT, at block 240. The Doppler FFT, at block 240, essentially means converting the chirp dimension of the three-dimensional cube into Doppler, which indicates relative speed of the object 140. The Doppler FFT, at block 240, results in a range-Doppler-beam map 245. Performing detection, at block 250, refers to performing detection using data that is affected by vibration, since no vibration estimation or cancellation is performed at this stage. The detections 255 resulting from performing detection, at block 250, indicate the range, Doppler (i.e., relative speed), and beam (i.e., azimuth angle and elevation angle) at which energy exceeds a specified threshold in the range-Doppler-beam map 245. As FIG. 2 indicates, the detections 255 are provided to block 310 (FIG. 3).

Figure 3:
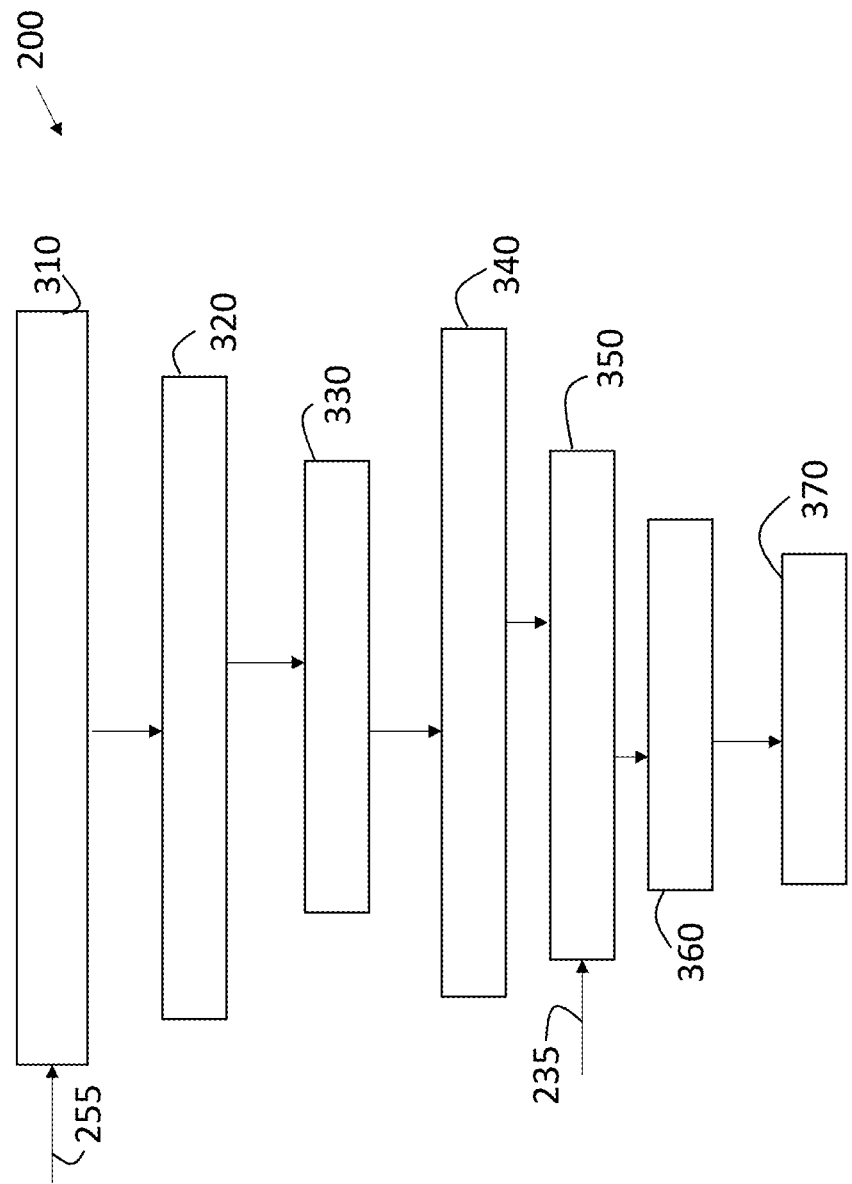
FIG. 3 is a process flow of additional aspects of the method of mitigating vibration in a radar system disposed on or in a vehicle according to one or more embodiments.

FIG. 3 is a process flow of additional aspects of the method 200 of mitigating vibration in a radar system 110 disposed on or in a vehicle 100 according to one or more embodiments. At block 310, the detections 255 obtained by performing detection, at block 250, are used in estimating vibration parameters per detection. Each detection 255 includes a target Doppler component and a vibration effect component. The detection 255 may be represented as:

$$s(t_n) = e^{2\pi j(f_d t_n + A_{vib} \sin(2\pi f_{vib} t_n))} \quad [\text{EQ. 1}]$$

In EQ. 1, t is time, n is the index for the samples 215, $f_d$ is the Doppler frequency of the object 140 associated with the detection 255, $A_{vib}$ is the amplitude parameter of the vibration, and $f_{vib}$ is the frequency parameter of the vibration. Estimating the vibration parameters $A_{vib}$ and $f_{vib}$, at block 310, may be based on finding the values to maximize the following expression:

$$\underset{\tilde{A}_{vib}, \tilde{f}_{vib}}{\text{argmax}} \left\| \sum_{k=1}^{K} s(t_n) e^{2\pi j \tilde{A}_{vib} \sin(2\pi \tilde{f}_{vib} t_n)} e^{2\pi j \frac{kq}{K}} \right\|_{\infty} \quad [\text{EQ. 2}]$$

In EQ. 2, the index k is for K chirps and q is frequency.

At block 320, the processes include estimating global vibration parameters $\tilde{A}_{global}$ and $\tilde{f}_{global}$ from the vibration parameters per detection $A_{vib}$ and $f_{vib}$, estimated at block 310. The vibration parameters per detection 255 are along the radial vector between the radar system 110 and the object 140 associated with the detection 255. The global vibration amplitude is $\tilde{A}_{global_i}$ per detection 255 (using index i) is estimated using a rotation function on the vibration amplitude $A_{vib}$. The estimated azimuth $az_i$ and elevation $el_i$ per detection 255 is also used:

$$\tilde{A}_{global_i} = \frac{\tilde{A}_{vib_i}}{\cos(az_i)\cos(el_i)} \quad [\text{EQ. 3}]$$

Global vibration frequency $\tilde{f}_{global}$ does not vary with direction of arrival. Thus, for each detection 255:

$$\tilde{f}_{global_i} = \tilde{f}_{vib_i} \quad [\text{EQ. 4}]$$

When I detections 255 are used to estimate the global vibration parameters $\tilde{A}_{global}$ and $\tilde{f}_{global}$, estimation accuracy is improved:

$$\tilde{A}_{global} = \frac{1}{I} \sum_{i=1}^{I} \tilde{A}_{global_i} \quad [\text{EQ. 5}]$$

$$\tilde{f}_{global} = \frac{1}{I} \sum_{i=1}^{I} \tilde{f}_{global_i} \quad [\text{EQ. 6}]$$

At block 330, tracking vibration parameters $\tilde{A}_{global}$ and $\tilde{f}_{global}$ refers to smoothing the parameters in time, between frames, in order to improve their accuracy. A filter (e.g., alpha filter) is used for the smoothing and essentially provides a weighted average of the parameter value for the previous estimations (m−1) for the current estimation (m). The weighting values α of the filter may be predetermined based on the platform (e.g., vehicle 100) and factors that affect the vibration of the radar system 110. Filtered values are obtained at block 330 using the results of EQS. 5 and 6, as:

$$\tilde{A}_{global}{}^m = \alpha_A \tilde{A}_{global}{}^m + (1-\alpha_A)\tilde{A}_{global}{}^{m-1} \quad [\text{EQ. 7}]$$

$$\tilde{f}_{global}{}^m = \alpha_f \tilde{f}_{global}{}^m + (1-\alpha_f)\tilde{f}_{global}{}^{m-1} \quad [\text{EQ. 8}]$$

The tracking (i.e., filtering), at block 330, is used in vibration cancellation, which is performed at blocks 340 and 350.

At block 340, the processes include projecting vibration to all directions of arrival (all azimuth and elevation in the field of view). As previously noted, vibration frequency is the same for all directions of arrival. Thus, the vibration frequency per direction of arrival is determined as:

$$\tilde{f}^m_{beam_p} = \tilde{f}^m_{global} \quad [\text{EQ. 9}]$$

Vibration amplitude per direction of arrival is obtained using a rotation function with the azimuth $az_{beam_p}$ and elevation $el_{beam_p}$ associated with each direction of arrival, as:

$$\tilde{A}^m_{beam_p} = \tilde{A}^m_{global} \cos(az_{beam_p})\cos(el_{beam_p}) \quad [\text{EQ. 10}]$$

Based on the projected vibration, the vibration displacement s(t) for each beam may be determined from the results of EQS. 9 and 10 as:

$$s(t) = \tilde{A}^m_{beam_p} \sin(2\pi \tilde{f}^m_{beam_p} t) \quad [\text{EQ. 11}]$$

At block 350, applying vibration cancellation refers to cancelling the estimated vibration displacement s(t) at the raw data level. Each reflection 155 is dependent on its direction of arrival. Thus, energy values (RCBmap) from the range-chirp-beam map 235 obtained from block 230 are corrected in the chirp dimension to cancel the effects of vibration, to obtain corrected values C-RCBmap, as follows:

$$C\text{-RECBmap} = \text{RCBmap} \cdot e^{-2\pi j \tilde{A}^m_{beam_p} \sin(s\pi \tilde{f}^m_{beam_p} t_n)} \quad [\text{EQ. 12}]$$

At block 360, performing Doppler FFT is repeated (as at block 240) but with the corrected values C-RCBmap for the range-chirp-beam map, obtained at block 350. Performing detection, at block 370, using the range-Doppler-beam map that results from the Doppler FFT at block 360 refers to performing detection of objections 140 without the effects of vibration. Thus, based on the vibration estimation, at block 310, and the vibration cancellation, at blocks 340 and 350, detection may be performed 370 with higher SNR and higher accuracy and eliminate false alarms caused by vibrations.

Figure 4:
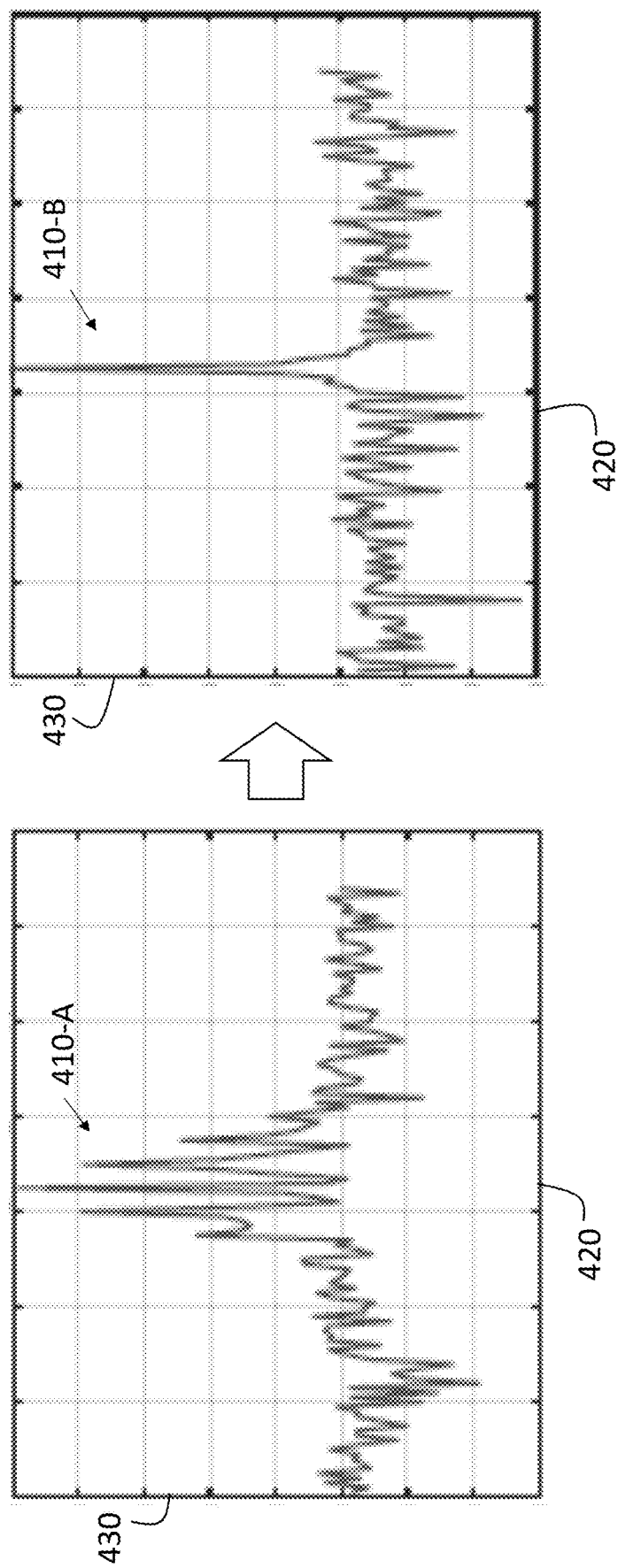
FIG. 4 illustrates the effect of mitigating vibration in a radar system according to one or more embodiments.

FIG. 4 illustrates the effect of mitigating vibration in a radar system 110 according to one or more embodiments. The graphs 410-A and 410-B show range-Doppler-beam results for a single range bin. Specifically, graph 410-A shows the range-Doppler-beam results from block 240, prior to vibration cancellation, and graph 410-B shows the Range-Doppler-beam results from block 360, following vibration cancellation. Doppler bin is indicated along axis 420, and power in decibels (dB) is indicated along axis 430. Graph 410-B, in comparison to graph 410-A, exhibits higher SNR. As a result, false detection of an object 140 is less likely following the vibration cancellation.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of mitigating vibration in a radar system on a moving platform, the method comprising:
   obtaining received signals resulting from reflections of transmitted signals by one or more objects in a field of view of the radar system, wherein the received signals are a three-dimensional data cube;
   processing the received signals to obtain a first three-dimensional map and a second three-dimensional map;
   estimating the vibration based on performing a first detection using the second three-dimensional map;
   cancelling the vibration from the first three-dimensional map to obtain a corrected first three-dimensional map;
   obtaining a corrected second three-dimensional map by further processing the corrected first three-dimensional map; and
   performing a second detection using the corrected second three-dimensional map.

2. The method according to claim 1, wherein the radar system includes multiple transmit channels and receive channels, the transmitted signals are linear frequency modulated continuous wave signals referred to as chirps, and the obtaining the received signals includes obtaining the three-dimensional data cube with a time dimension, a chirp dimension, and a channel dimension.

3. The method according to claim 2, wherein the processing the received signals includes performing a fast Fourier transform (FFT) and performing beamforming and obtaining the first three-dimensional map with a range dimension, the chirp dimension, and a beam dimension.

4. The method according to claim 3, wherein the processing the received signals also includes performing a second FFT on the first three-dimensional map and obtaining the second three-dimensional map with the range dimension, a Doppler dimension, and the beam dimension.

5. The method according to claim 4, wherein the estimating the vibration includes estimating amplitude and frequency of vibration.

6. The method according to claim 3, wherein the obtaining the corrected second three-dimensional map from the corrected first three-dimensional map includes performing an FFT on the corrected first three-dimensional map.

7. The method according to claim 1, wherein the moving platform is a vehicle, and the performing the second detection provides information used to augment or automate operation of the vehicle.

8. A radar system subject to vibration on a moving platform, the radar system comprising:
   at least one receive antenna configured to obtain received signals resulting from reflections of transmitted signals by one or more objects in a field of view of the radar system, wherein the received signals are a three-dimensional data cube; and
   a processor configured to process the received signals to obtain a first three-dimensional map and a second three-dimensional map, to estimate the vibration based on a first detection using the second three-dimensional map, to cancel the vibration from the first three-dimensional map to obtain a corrected first three-dimensional map, to obtain a corrected second three-dimensional map by further processing the corrected first three-dimensional map, and to perform a second detection using the corrected second three-dimensional map.

9. The radar system according to claim 8, wherein the radar system includes a plurality of transmit channels and a plurality of receive channels, the transmitted signals are linear frequency modulated continuous wave signals referred to as chirps, and the three-dimensional data cube has a time dimension, a chirp dimension, and a channel dimension.

10. The radar system according to claim 9, wherein the processor is further configured to perform a fast Fourier transform (FFT) and beamforming to obtain the first three-dimensional map with a range dimension, the chirp dimension, and a beam dimension.

11. The radar system according to claim 10, wherein the processor is also configured to perform a second FFT on the first three-dimensional map to obtain the second three-dimensional map with the range dimension, a Doppler dimension, and the beam dimension.

12. The radar system according to claim 11, wherein the processor estimating the vibration includes estimating amplitude and frequency of vibration.

13. The radar system according to claim 10, wherein the processor is configured to obtain the corrected second three-dimensional map from the corrected first three-dimensional map by performing an FFT on the corrected first three-dimensional map.

14. The radar system according to claim 8, wherein the moving platform is a vehicle.

15. The radar system according to claim 14, wherein the processor obtains information used to augment or automate operation of the vehicle based on performing the second detection.

16. A vehicle, comprising:
a radar system subject to vibration, the radar system comprising:
at least one receive antenna configured to obtain received signals resulting from reflections of transmitted signals by one or more objects in a field of view of the radar system, wherein the received signals are a three-dimensional data cube; and
a processor configured to process the received signals to obtain a first three-dimensional map and a second three-dimensional map, to estimate the vibration based on a first detection using the second three-dimensional map, to cancel the vibration from the first three-dimensional map to obtain a corrected first three-dimensional map, to obtain a corrected second three-dimensional map by further processing the corrected first three-dimensional map, and to perform a second detection using the corrected second three-dimensional map; and
a vehicle controller configured to obtain information from the second detection and augment or automate operation of the vehicle based on the information.

17. The vehicle according to claim 16, wherein the radar system includes a plurality of transmit channels and a plurality of receive channels, the transmitted signals are linear frequency modulated continuous wave signals referred to as chirps, and the three-dimensional data cube has a time dimension, a chirp dimension, and a channel dimension.

18. The vehicle according to claim 17, wherein the processor is configured to perform a fast Fourier transform (FFT) and beamforming to obtain the first three-dimensional map with a range dimension, the chirp dimension, and a beam dimension.

19. The vehicle according to claim 18, wherein the processor is also configured to perform a second FFT on the first three-dimensional map to obtain the second three-dimensional map with the range dimension, a Doppler dimension, and the beam dimension.

20. The vehicle according to claim 18, wherein the processor is configured to obtain the corrected second three-dimensional map from the corrected first three-dimensional map by performing an FFT on the corrected first three-dimensional map.

* * * * *